United States Patent
Liu et al.

(10) Patent No.: US 9,448,654 B2
(45) Date of Patent: Sep. 20, 2016

(54) TOUCH SCREEN AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yingming Liu, Beijing (CN); Xue Dong, Beijing (CN); Haisheng Wang, Beijing (CN); Jian Guo, Beijing (CN)

(73) Assignees: BEIJING BOE OPTOELECTRONICS TECHNOLOGY CO., LTD. (CN); BOE TECHNOLOGY GROUP CO., LTD. (CN)

( * ) Notice: Subject to any disclaimer, the term of this patent is extended or adjusted under 35 U.S.C. 154(b) by 61 days.

(21) Appl. No.: 14/235,922

(22) PCT Filed: Oct. 11, 2013

(86) PCT No.: PCT/CN2013/085027
§ 371 (c)(1),
(2) Date: Jan. 29, 2014

(87) PCT Pub. No.: WO2014/198099
PCT Pub. Date: Dec. 18, 2014

(65) Prior Publication Data
US 2015/0253912 A1 Sep. 10, 2015

(30) Foreign Application Priority Data

Jun. 13, 2013 (CN) .......................... 2013 1 0232409

(51) Int. Cl.
G06F 3/041 (2006.01)
G06F 3/044 (2006.01)
G06F 1/16 (2006.01)

(52) U.S. Cl.
CPC ............... *G06F 3/0412* (2013.01); *G06F 1/16* (2013.01); *G06F 3/044* (2013.01); *G06F 2203/04111* (2013.01)

(58) Field of Classification Search
CPC ............. G09G 3/3241; G09G 3/3208; G09G 3/3291; G09G 3/3266
See application file for complete search history.

(56) References Cited

U.S. PATENT DOCUMENTS 8,907,224 B2 12/2014 Kajiya et al.
2008/0062148 A1* 3/2008 Hotelling ............ G02F 1/13338
345/174

(Continued)

FOREIGN PATENT DOCUMENTS

CN 101943814 A 1/2011
CN 102792247 A 11/2012

(Continued)

OTHER PUBLICATIONS

Chinese Second Office Action Dated Dec. 19, 2015, Application No. 2013102324091, 5 pages [with English Translation].

(Continued)

*Primary Examiner* — Shaheda Abdin
(74) *Attorney, Agent, or Firm* — Brooks Kushman P.C.

(57) ABSTRACT

The embodiment provides a touch screen and a display device. The touch screen has: a first substrate and a second substrate arranged in opposite to each other, and a touch-driving electrode and a touch-sensing electrode arranged in a crossing manner on the first substrate and the second substrate, a non-flat region is provided at a region of the first substrate on which the touch-sensing electrode is to be formed, and the touch-sensing electrode is arranged on the first substrate in accordance with a shape of the first substrate so as to be formed with a non-flat region; and/or a non-flat region is provided at a region of the second substrate on which the touch-driving electrode is to be formed, and the touch-driving electrode is arranged on the second substrate in accordance with a shape of the second substrate so as to be formed with a non-flat region.

20 Claims, 9 Drawing Sheets

(56) References Cited

U.S. PATENT DOCUMENTS

| | | | | |
|---|---|---|---|---|
| 2011/0242020 | A1* | 10/2011 | Kang | G06F 3/044 345/173 |
| 2012/0086661 | A1* | 4/2012 | Shi | G06F 3/041 345/173 |

FOREIGN PATENT DOCUMENTS

| | | | |
|---|---|---|---|
| CN | 103064576 | A | 4/2013 |
| CN | 103105970 | A | 5/2013 |
| CN | 103309536 | A | 9/2013 |
| CN | 203299797 | U | 11/2013 |
| KR | 20120121573 | A | 11/2012 |

OTHER PUBLICATIONS

Chinese Office Action CN 2013102324091 dated Aug. 4, 2015; 12 pages [with English Translation].

PCT International Search Report and Written Opinion PCT/CN2013/085027 dated Mar. 20, 2014, 17 pages [with English Translation].

Chinese Third Office Action dated May 4, 2016, Application No. 20130232409.1, 7 Pages.

\* cited by examiner

TOUCH SCREEN AND DISPLAY DEVICE

CROSS-REFERENCE TO RELATED APPLICATION

This application is the U.S. national phase of PCT Application No. PCT/CN2013/085027 filed on Oct. 11, 2013, which claims priority to Chinese Patent Application No. 201310232409.1 filed on Jun. 13, 2013, the disclosures of which are incorporated in their entirety by reference herein.

TECHNICAL FIELD

The embodiment of the present invention relates to the field of display technology, in particular to a touch screen and a display device.

BACKGROUND

A touch screen with a touch function has increasingly become a mainstream technology in the display field due to its simple, light and thin structure as well as low production cost.

The touch screens mainly include capacitive touch screen, resistive touch screen, optical touch screen, and so on. Among them, the capacitive touch screen is a relatively common and universal one.

The working principle of the capacitive touch screen will be briefly described hereinafter in conjunction with the structure thereof.

FIG. 1 is a top view of a capacitive touch screen. Referring to FIG. 1, the capacitive touch screen comprises a plurality of touch-driving electrodes 800 arranged along a first direction and a plurality of touch-sensing electrodes 900 arranged along a second direction. The first and second directions are perpendicular to each other. The adjacent touch-driving electrode 800 and the touch-sensing electrode 900 are coupled to each other so as to generate mutual capacitance Cm. When a finger touches the screen, an equivalent electric field of the finger will change a value of the mutual capacitance Cm. A touch detecting unit for detecting a touch point detects a variation of the current corresponding to the mutual capacitance Cm at the touch point before and after it is touched by the finger, and thereby detects a position of the touch point.

FIG. 2 is a sectional view of the touch-driving electrode 800 and the touch-sensing electrode 900 as shown in FIG. 1. Referring to FIG. 2, a voltage is applied to the touch-driving electrode 800 and the touch-sensing electrode 900 when the touch screen is touched, so as to form an electric field therebetween. The line with an arrow in FIG. 2 represents an electric field line. The electric field formed between the touch-driving electrode 800 and the touch-sensing electrode 900 consists of two portions, i.e., a forward electric field formed between the opposite, overlapping surfaces of the touch-driving electrode 800 and the touch-sensing electrode 900, and a projection electric field formed between the non-overlapping surfaces. The capacitance between the touch-driving electrode and the touch-sensing electrode corresponding to the forward electric field is parasitic capacitance C1 that has no beneficial effect on the touch, and the capacitance C0 between the touch-driving electrode and the touch-sensing electrode corresponding to the projection electric field is capacitance that can be changed by the finger. Cm is approximately equal to C0+C1. The finger can change the value of the mutual capacitance Cm merely by changing the electric field projected to outside of the touch-driving electrode 800 and the touch-sensing electrode 900.

In terms of structure, the touch screens at least include Add-on touch screen and In-Cell/On-Cell touch screen.

Regardless of the Add-on touch screen or the In-Cell/On-Cell touch screen, when a ratio of the forward electric field to the projection electric field is big, the variation of the current or voltage, corresponding to the capacitance Cm detected by the touch detecting unit at the touch point before and after it is touched by the finger, is not obvious, and the touch effect is poor. In order to ensure a relatively big variation of the current or voltage corresponding to the capacitance Cm at the touch point before and after the touching and to obtain a better touch effect, it is required to increase a surface area of at least one of the touch-sensing electrode and the touch-driving electrode. Increasing the surface area of the touch-sensing electrode and/or the touch-driving electrode will result in an increase in an area of a vertically overlapping surface between the touch-sensing electrode and the touch-driving electrode as well as an increase in the parasitic capacitance therebetween, thereby it is difficult to reduce the ratio of the forward electric field to the projection electric field and improve the touch effect. When the touch-sensing electrode and the touch-driving electrode are built in the display screen, there is also big parasitic capacitance between the touch-sensing electrode and the touch-driving electrode with large areas, and the conductive, functional film layers in the display screen such as a gate line, a data line and a common electrode. In addition, the quality of the image displayed on the display screen will be lowered.

SUMMARY

An object of the embodiment of the present invention is to provide a touch screen and a display device, so as to obtain a better touch effect.

To achieve the above object, the embodiment of the present invention provides a touch screen, comprising a first substrate and a second substrate arranged in opposite to each other, and a touch-driving electrode and a touch-sensing electrode arranged in a crossing manner on the first substrate and the second substrate, respectively, a non-flat region is provided at a region of the first substrate on which the touch-sensing electrode is to be formed, and the touch-sensing electrode is arranged on the first substrate in accordance with a shape of the first substrate so as to be formed with a non-flat region corresponding to the non-flat region of the first substrate; and/or a non-flat region is provided at a region of the second substrate on which the touch-driving electrode is to be formed, and the touch-driving electrode is arranged on the second substrate in accordance with a shape of the second substrate so as to be formed with a non-flat region corresponding to the non-flat region of the second substrate.

Preferably, the first substrate and the second substrate are different from each other, and the non-flat region of the first substrate is a concave region formed on the first substrate with a flat surface and below a horizontal plane of the surface of the first substrate.

The touch screen further comprises a black matrix and a color resin layer. The black matrix is arranged on the first substrate in accordance with the concave region formed on the first substrate so as to be formed with a concave region corresponding to the concave region formed on the first substrate. The touch-sensing electrode is arranged on the black matrix in accordance with a shape of the black matrix so as to be formed with a concave region corresponding to the concave region of the black matrix. The color resin layer is arranged above the black matrix. A plurality of pixel units distributed in a matrix manner is provided at one side of the second substrate close to the first substrate, and the touch-driving electrode is arranged above the pixel units.

Preferably, the touch screen further comprises a flat layer formed on the color resin layer and a spacer formed on the flat layer.

Preferably, the non-flat region is a concave region. The concave region is provided at a region corresponding to the touch-sensing electrode, it is a groove-shaped region or a plurality of porous regions arranged along an extending direction of the touch-sensing electrode; and/or the concave region is provided at a region corresponding to the touch-driving electrode, it is a groove-shaped region or a plurality of porous regions arranged along an extending direction of the touch-driving electrode.

Preferably, the groove-shaped region corresponding to the touch-sensing electrode has a longitudinal section of a trapezoid, triangle or arc shape along a direction of a short edge of the touch-sensing electrode. The groove-shaped region corresponding to the touch-driving electrode has a longitudinal section of a trapezoid, triangle or arc shape along a direction of a short edge of the touch-driving electrode.

Preferably, the groove-shaped region corresponding to the touch-sensing electrode has a longitudinal section of an isosceles trapezoid, isosceles triangle or circle arc shape along a direction of the short edge of the touch-sensing electrode. The groove-shaped region corresponding to the touch-driving electrode has a longitudinal section of an isosceles trapezoid, isosceles triangle or circle arc shape along a direction of the short edge of the touch-driving electrode.

Preferably, there is an equal distance between any two adjacent porous regions among the plurality of porous regions corresponding to the touch-driving electrode or the touch-sensing electrode.

Preferably, the touch-sensing electrode is arranged at a region corresponding to the black matrix.

Preferably, a vertically overlapping surface between the touch-driving electrode and the touch-sensing electrode has an area less than a surface area of the touch-sensing electrode.

In another aspect, the embodiment of the present invention provides a display device comprising the above-mentioned touch screen.

According to the embodiment of the present invention, the substrates are provided with non-flat regions at the regions corresponding to the touch-driving electrode and/or touch-sensing electrode, the touch-sensing electrode is formed on the substrate in accordance with the non-flat region corresponding thereto so as to be formed with a corresponding non-flat region, and the touch-driving electrode is formed on the substrate in accordance with the non-flat region corresponding thereto so as to be formed with a corresponding non-flat region. The touch-sensing electrode with the non-flat region has a projection area on the substrate less than its surface area, and the touch-driving electrode with the non-flat region has a projection area on the substrate less than its surface area. As a result, it is able to improve the ratio of the projection electric field between the touch-driving electrode and the touch-sensing electrode to the forward electric field. In addition, the difficulty of manufacturing the touch screen may be reduced by forming the non-flat region on a substrate body, thereby it is able to reduce the possibility of undesirable phenomena for the touch screen.

DETAILED DESCRIPTION

Figure 1:
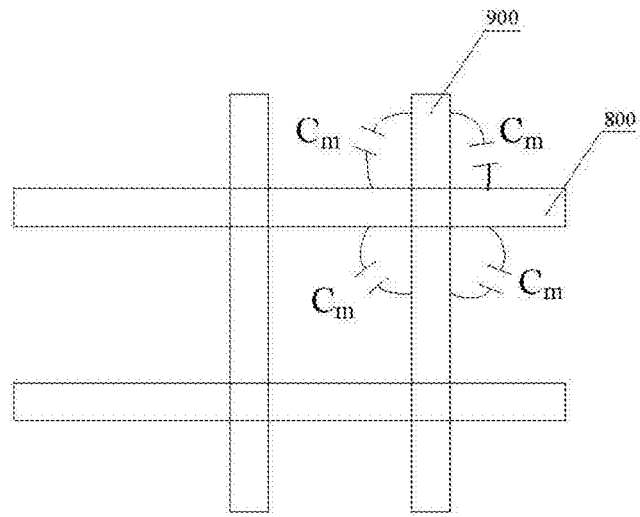
FIG. 1 is a top view of an existing capacitive touch screen.

The embodiment of the present invention provides a touch screen and a display device, so as to reduce a ratio of a forward electric field to the projection electric field between a touch-driving electrode and a touch-sensing electrode, thereby to improve a touch effect thereof.

In the present invention, a non-flat region is provided at a region corresponding to each of the touch-sensing electrode and/or the touch-driving electrode on a substrate on which the touch-sensing electrode and/or the touch-sensing electrode are to be formed, and the touch-sensing electrode and/or the touch-driving electrode are formed on the substrate in accordance with a shape of the substrate so as to be formed with a corresponding non-flat region. As a result, it is able to obtain the touch-sensing electrode with a large surface area on the premise of ensuring a small vertically overlapping surface between the touch-driving electrode and the touch-sensing electrode, thereby to reduce the ratio of the forward electric field to the projection electric field between the touch-driving electrode and the touch-sensing electrode, and improve a touch effect of the touch screen. When the touch-sensing electrode and the touch-driving electrode are built in a display screen, it is also able to reduce the parasitic capacitance between the touch-sensing electrode or the touch-driving electrode and a conductive, functional film layer in the display screen, such as a gate line, a data line or a common electrode, thereby to improve the quality of an image displayed on the display screen.

It is to be noted that, the substrate is, e.g., a glass substrate or a substrate made of the other material, without any functional film layer thereon. In other words, the non-flat region is formed on a substrate body.

The touch screen of the embodiment of the present invention may be a capacitive touch screen with any structures, e.g., an Add-on touch screen, or an On-Cell or In-Cell touch screen integrated into the display screen. In the touch screen, the touch-driving electrode and the touch-sensing electrode may be arranged on the same substrate or on different substrates. When the touch-driving electrode and the touch-sensing electrode are arranged on the same substrate, they may be arranged at one side, or opposite sides, of the substrate. This structure of the touch screen is for illustrative purpose only, and the present invention is not limited to such touch screen.

The non-flat region is provided on the substrate, so the substrate has a curved surface rather than a planar surface. At least one of the touch-sensing electrode and the touch-driving electrode is arranged on the substrate in accordance with the shape of the substrate, so as to form a corresponding curved electrode.

The non-flat region may be, but not limited to, a concave region, a convex region, or may include both of them at the same time.

Preferably, the concave region formed on the substrate may be, but not limited to, a groove-shaped region or a porous region. In the porous region, each hole has a depth less than a thickness of the substrate, i.e., it is not a through-hole. In the groove-shaped region, the groove has a depth less than the thickness of the substrate. The convex region may be a bar-like or a post-like convex region.

The touch screen and the display device of the present invention will be schematically described hereinafter by taking the concave region as an example.

Followings are different embodiments for the touch screens with different structures.

First Embodiment

The Touch Screen is an Add-on Touch Screen

Figure 3:
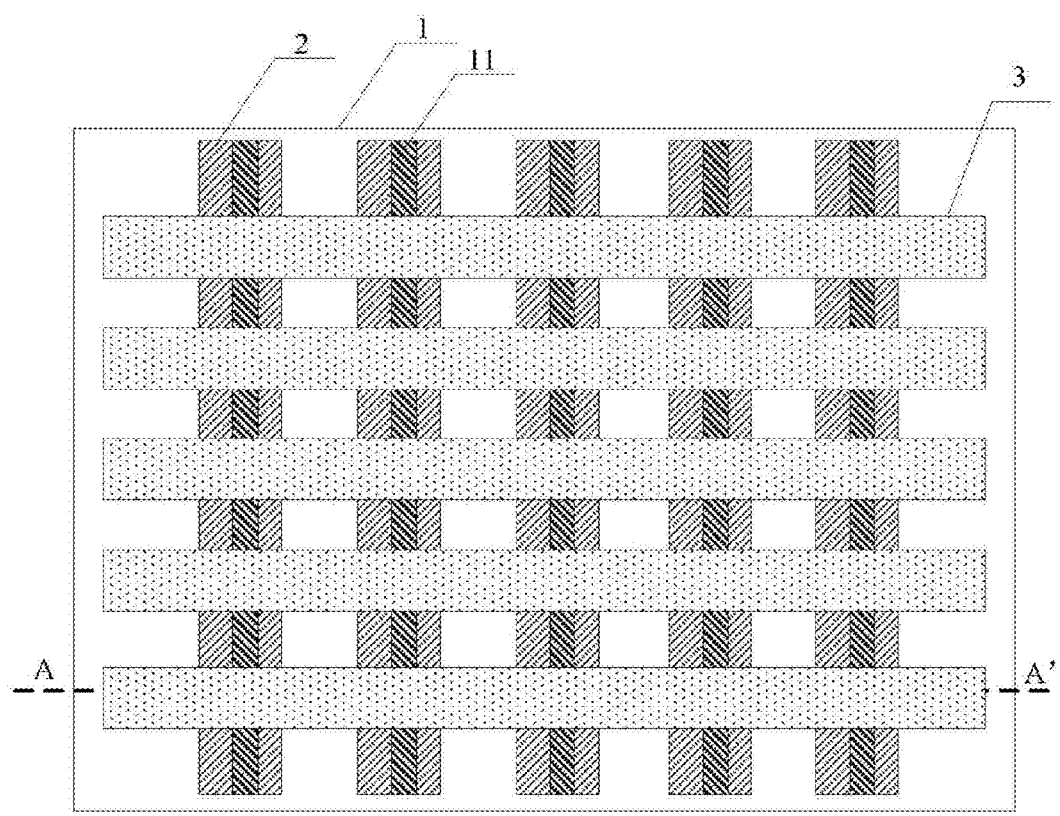
FIG. 3 is a top view of a substrate with a non-flat region corresponding to a touch-sensing electrode according to the first embodiment of the present invention.

FIG. 3 is a top view of a touch screen of the embodiment of the present invention. As shown in FIG. 3, the touch screen comprises: a substrate 1; a plurality of touch-sensing electrodes 2 distributed on the substrate 1 along a first direction; and a plurality of touch-driving electrodes 3 distributed on the substrate 1 along a second direction intersecting the first direction, the touch-driving electrode 3 and the touch-sensing electrode 2 are insulated from each other.

Figure 4:
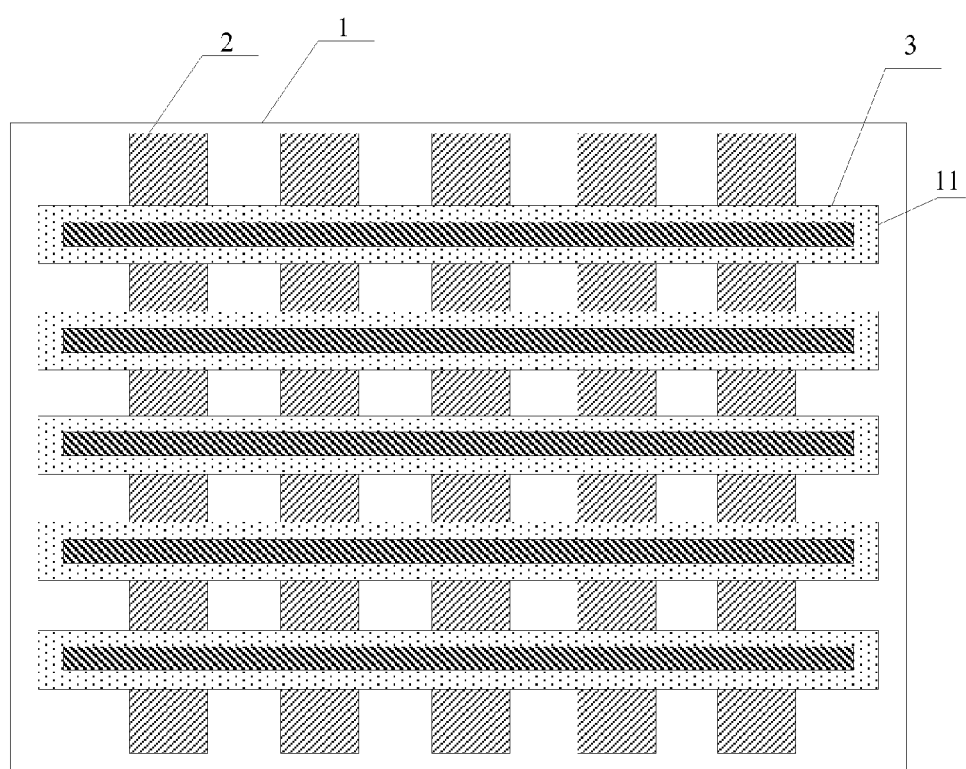
FIG. 4 is a top view of a substrate with a non-flat region corresponding to a touch-driving electrode according to the embodiment of the present invention.
Figure 5:
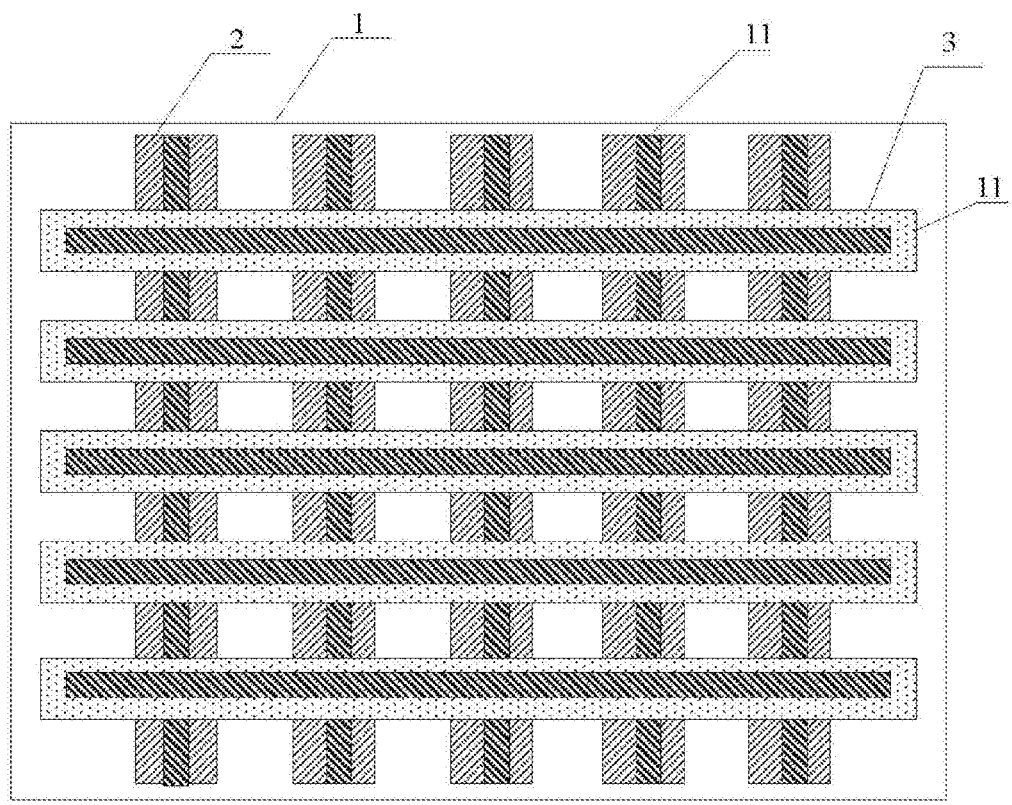
FIG. 5 is a top view of the substrate with the non-flat region corresponding to the touch-driving electrode and the touch-sensing electrode according to the embodiment of the present invention.

A non-flat region 11 is provided at a region corresponding to the touch-sensing electrode 2 on a side of the substrate 1 where the touch-sensing electrode 2 is to be formed; or as shown in FIG. 4, the non-flat region is provided at a region corresponding to the touch-driving electrode 3 on a side of the substrate 1 where the touch-driving electrode 3 is to be formed; or as shown in FIG. 5, the non-flat regions 11 are provided at the region corresponding to the touch-sensing electrode 2 on the side of the substrate 1 where the touch-sensing electrode 2 is to be formed and at the region corresponding to the touch-driving electrode 3 on the side of the substrate 1 where the touch-driving electrode 3 is to be formed.

Many methods may be used to form the non-flat region. For example, a groove-shaped or porous concave region below a horizontal plane of the substrate may be formed on the substrate with a planar surface but without any film layers structure. Specifically, the concave region can be etched in the substrate with a planar surface by means of dry etching or wet etching, thereby to form the substrate with a non-flat surface. For another example, a boss-shaped or post-shaped structure above the horizontal plane of the substrate may be formed on the substrate with a planar surface but without any film layers structure, thereby to form the substrate with a rugged surface.

The concave region may be a groove-shaped region 11 or a porous region as shown in FIG. 3.

In FIG. 3, the first direction is a vertical direction, while the second direction is a horizontal direction.

The present invention is described by increasing a surface area of the touch-sensing electrode in FIG. 3, by increasing a surface area of the touch-driving electrode in FIG. 4, and by increasing the surface areas of both the touch-sensing electrode and the touch-driving electrode in FIG. 5.

In the touch screen according to the first embodiment, the touch-driving electrode and the touch-sensing electrode may be arranged on the same substrate or on different substrates.

When the touch-driving electrode and the touch-sensing electrode are arranged on different substrates, each substrate may be provided with a non-flat region corresponding to the touch-driving electrode or the touch-sensing electrode, or any one of the substrates may be provided with the non-flat regions corresponding to the touch-driving electrode and the touch-sensing electrode, respectively.

When the touch-driving electrode and the touch-sensing electrode are arranged on the same substrate, they may be arranged at opposite sides, or at the same side, of the substrate. When the touch-driving electrode and the touch-sensing electrode are arranged at opposite sides of the substrate, the non-flat regions corresponding to the touch-driving electrode and the touch-sensing electrode may be provided at the opposite sides of the substrate, respectively. When the touch-driving electrode and the touch-sensing electrode are arranged at the same side of the substrate, the non-flat regions corresponding to the touch-driving electrode and the touch-sensing electrode may be provided at one side of the substrate at the same time. Of course, the non-flat region corresponding to one of the touch-driving electrode and the touch-sensing electrode may also be provided on the substrate. The parasitic capacitance between the touch-driving electrode and the touch-sensing electrode will be reduced and the touch effect of the touch screen will be improved as long as the surface area of at least one of the touch-driving electrode and the touch-sensing electrode is increased.

When the touch-driving electrode and the touch-sensing electrode are arranged at the same side of the substrate, they may be arranged at the same layer in an insulation manner, or at different layers.

It is to be noted that, in the touch screen of the present invention, the touch-driving electrode and the touch-sensing electrode are not limited to a rectangular shape. The touch-driving electrode and/or the touch-sensing electrode may also comprise a plurality of electrode units, each of which may be of a rectangular, quadrate, diamond-like or equilaterally polygonal shape etc.

Following is an example where the touch-driving electrode and the touch-sensing electrode are arranged at different layers of the same substrate. In order to illustrate the structure of the touch screen as an example in FIG. 3 in a clearer manner, FIG. 6 shows the section of the touch screen taken along a line A-A' in FIG. 3.

The touch screen comprises the substrate 1, the touch-sensing electrode 2 arranged on the substrate 1, a first insulating layer 4 arranged on the touch-sensing electrode 2, and the touch-driving electrode 3 arranged on the first insulating layer 4.

Figure 7:
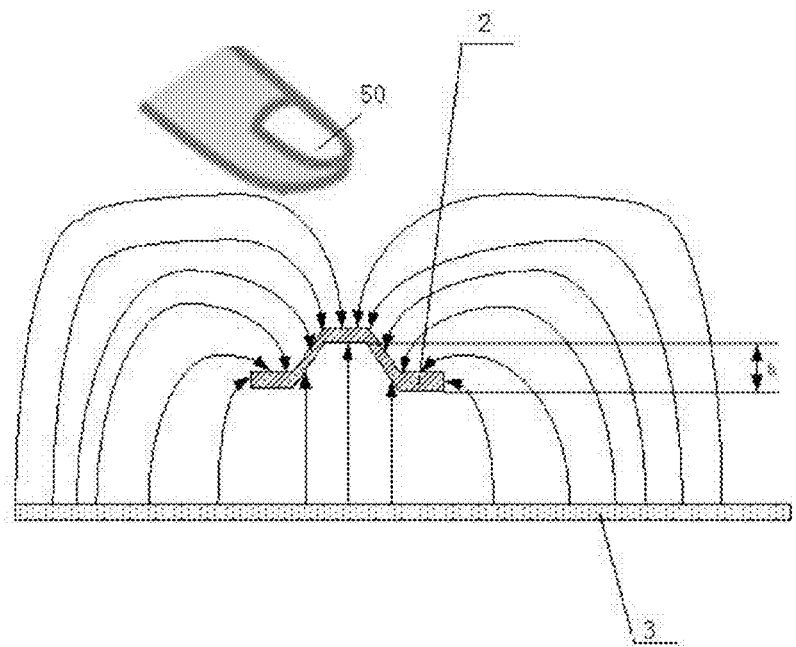
FIG. 7 is a schematic view showing an electric field formed between the touch-driving electrode and the touch-sensing electrode according to the embodiment of the present invention.

The substrate 1 is provided with the concave region facing the touch-sensing electrode 2, and the touch-sensing electrode 2 is arranged on the substrate 1 in accordance with the shape of the substrate 1 so as to be formed with the corresponding concave region. As shown in FIG. 7, the touch-sensing electrode 2 has a cross section of a curved line.

Figure 6:
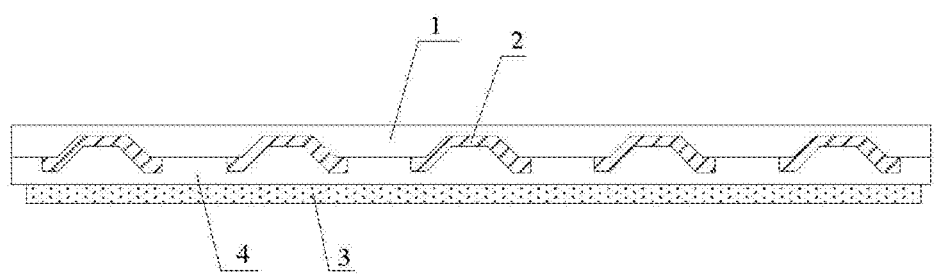
FIG. 6 is a sectional view of the touch screen in FIG. 3 taken along a line A-A'.

FIG. 6 shows one mode of the Add-on touch screens. However, the Add-on touch screens having the substrate with the concave regions are not limited to that as shown in FIG. 6, which will not be listed herein.

Following is the principle based on which the touch screen according to the first embodiment can improve the touch effect.

Figure 2:
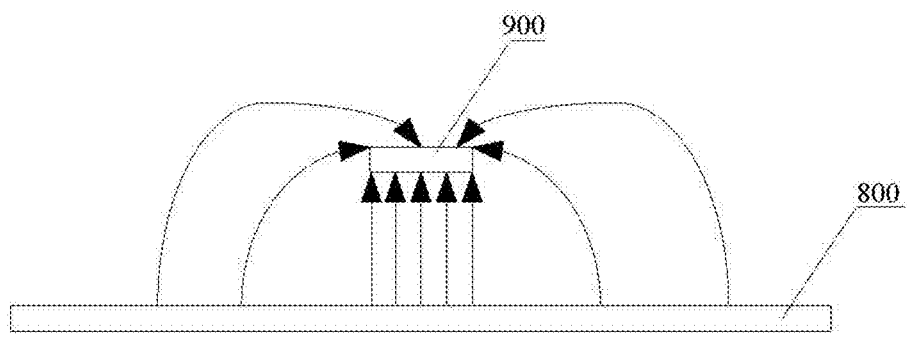
FIG. 2 is a sectional view of the capacitive touch screen in FIG. 1.

FIG. 7 is a schematic view showing one touch-sensing electrode 2 and one touch-driving electrode 3 in the touch screen in FIG. 6 as well as the forward electric field and projection electric field formed therebetween. In FIG. 7, the straight line or curved line with an arrow represents an electric field line. The touch-sensing electrode 2 is arranged on the substrate with the non-flat region so as to be formed with a corresponding non-flat region. The touch-sensing electrode 2 has a curved surface. As shown in FIG. 7, the touch-sensing electrode 2 has a cross section of a curved line along its short edge, and the vertically overlapping surface between the touch-driving electrode 3 and the touch-sensing electrode 2 has an area less than a surface area of the touch-sensing electrode 2. As compared with the arrangement mode of the existing touch-driving electrode 800 and touch-sensing electrode 900 as shown in FIG. 2, the arrangement mode of the touch-sensing electrode 2 in the present invention can reduce the ratio of the forward electric field to the projection electric field between the touch-driving electrode 3 and the touch-sensing electrode 2. When a finger 50 touches the touch screen, a size of the projection electric field will be changed, and a touch detection unit will determine a position of a touch point by detecting a variation of the current or voltage at the touch point before and after it is touched. When the ratio of the forward electric field to the projection electric field decreases, the parasitic capacitance between the touch-driving electrode and the touch-sensing electrode will decrease too, and there will be a large variation of the current or voltage at the touch point before and after it is touched. As a result, it is able to accurately detect a tiny variation of a projection electric field signal after the finger touches the touch screen, thereby to improve the touch effect of the touch screen obviously.

Of course, the concave region may also be arranged on a certain insulating layer, or on the other functional film layer, of the substrate, which, however, will result in the following deficiencies. (1) It is required to provide a single insulating layer on the substrate, so the touch screen will be too thick, and it is hard to achieve a light and thin touch screen. (2) It will be a complex process to form the concave region on the insulating layer, and various undesirable phenomena will easily occur for the touch screen.

To be specific, the concave region is usually provided on the insulating layer through a process such as photolithography and etching. In the case that the insulating layer is thin, it is easy to form a through-hole in the insulating layer (i.e., it is easy to form a via-hole that penetrating through the insulating layer). As a result, it will easily result in a short circuit between the conductive, functional film layers on both sides of the insulating layer (e.g., between the touch-driving electrode and the touch-sensing electrode). In addition, with respect to the built-in touch screen, various functional film layers have been prepared before forming the concave region on the insulating layer. When forming the concave region on the insulating layer, the process such as photolithography and etching will easily result in deficient elements. Furthermore, when the insulating layer is thick, the light transmission rate of the display screen and the display effect will be affected. When the insulating layer is thin, it is easy to form a through-hole in the insulating layer (i.e., it is easy to form a via-hole that penetrating through the insulating layer), and as a result, it will easily result in a short circuit between the conductive, functional film layers on both sides of the insulating layer.

In the touch screen of the present invention, the substrate is thicker than the insulating layer, so it is able, without increasing the thickness of the substrate, to provide the concave region on the substrate with an existing thickness. The thickness of the manufactured touch screen is not increased. In addition, before forming the concave region, there is no functional film layer formed on the substrate, so undesirable phenomena of the touch screen will not be caused due to the formation of the concave region, and the process will not be so complex.

Referring to FIG. 7, theoretically, the bigger the depth h of the concave region provided on the substrate 1, the larger the surface area of the touch-sensing electrode 2 and/or the touch-driving electrode 3. The area of the vertically overlapping surface between the touch-driving electrode 3 and the touch-sensing electrode 2 will not vary along with the depth h of the concave region, so a bigger projection electric field between the touch-driving electrode 3 and the touch-sensing electrode 2 as well as a better touch effect will be obtained. Hence, the concave region with an appropriate depth may be formed on the substrate according to the actual need during implementing, so as to form a corresponding concave region with a certain depth on the touch-sensing electrode. The depth of the concave region is not specifically defined in the present invention.

The concave region on the substrate will be described hereinafter in conjunction with the touch screen according to the first embodiment. The concave region may be provided on the substrate in various forms, e.g., a groove-shaped region or a porous region. Followings are examples where a groove-shaped region or porous region is provided on the substrate at a region corresponding to the touch-sensing electrode.

Mode 1: The Concave Region is a Groove-Shaped Region.

Figure 8:
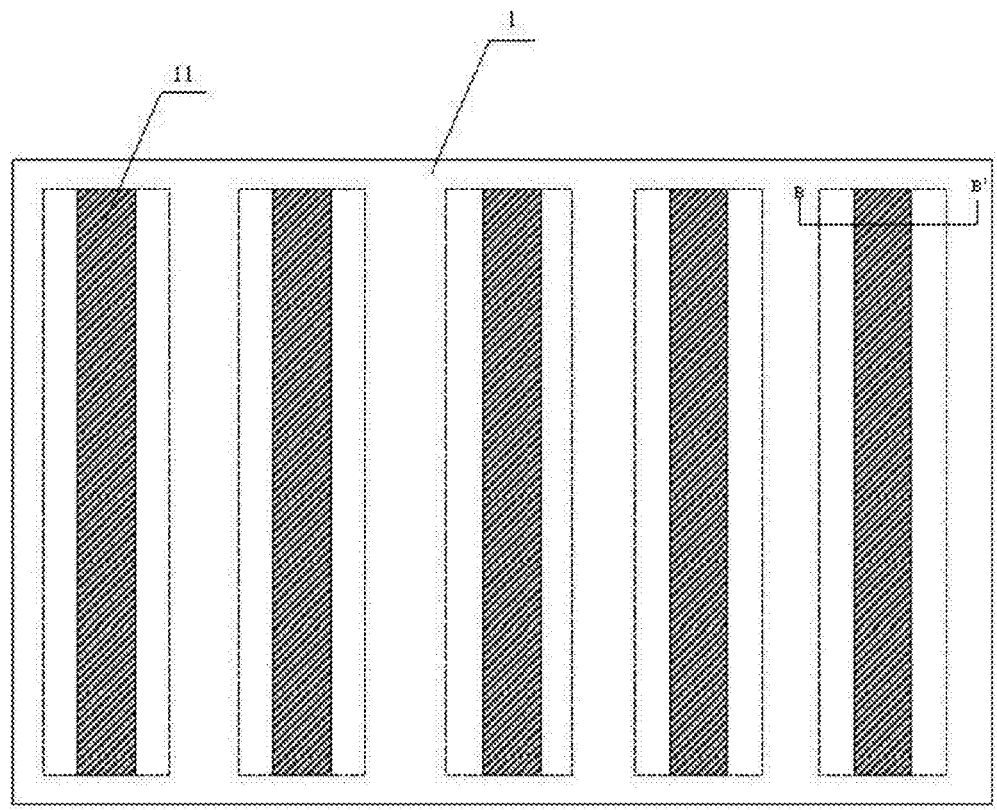
FIG. 8 is a top view of the substrate with a groove-shaped region according to the first embodiment of the present invention.

FIG. 8 shows a groove-shaped region 11 provided on the substrate 1 at a region (e.g., the region defined by the closed broken line) corresponding to the touch-sensing electrode.

For example, under the permission of a layout process, the groove-shaped region has a longitudinal section of a trapezoid, rectangle, circle arc or triangle shape etc along the short edge of the touch-sensing electrode (i.e., in a direction along B-B' as shown in FIG. 8). The touch-sensing electrode 2 as shown in FIGS. 3-7 has a longitudinal section of a trapezoid shape along its short edge. During the implementation, the longitudinal section of the concave region along the short edge of groove depends on the layout process conditions and the width of the touch-sensing electrode, and it is not defined herein.

Figure 9:
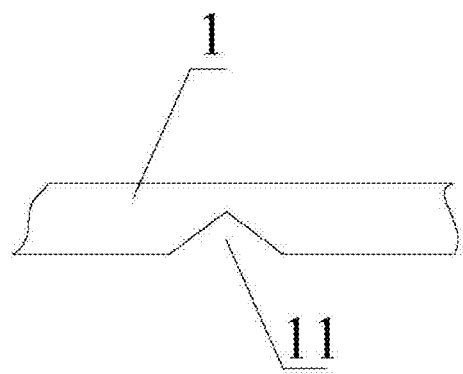
FIG. 9 is a schematic view showing a touch screen having the concave region with a cross section of a triangle shape according to the first embodiment of the present invention.

FIG. 9 is a partially sectional view of the substrate 1 in the touch screen in FIG. 8 taken along the line B-B', where the groove-shaped region 11 has a longitudinal section of a triangle shape along its short edge.

Figure 10:
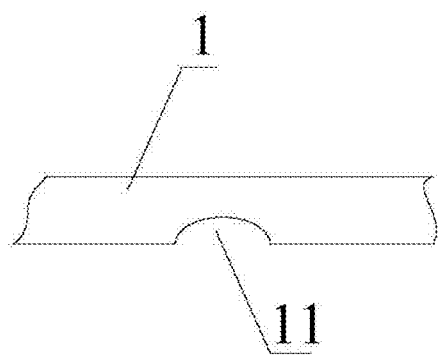
FIG. 10 is a schematic view showing a touch screen having the concave region with a cross section of an arc shape according to the first embodiment of the present invention.

FIG. 10 is a sectional view of the substrate 1 in the touch screen in FIG. 8 taken along the line B-B', where the groove-shaped region 11 has a longitudinal section of an arc shape along its short edge.

Preferably, in order to ensure a consistent intensity of the projection electric field at both sides of the touch-sensing electrode as possible and to ensure a consistent touch effect at any positions on the whole touch screen, the groove-shaped region has a longitudinal section of an isosceles triangle or isosceles trapezoid shape or a part of a circle (an circle arc shape) etc along its short edge.

One groove-shaped region or a plurality of mutual parallel groove-shaped regions may be provided on the substrate at a region corresponding to one touch-sensing electrode. Every groove-shaped region in FIGS. 3-10 corresponds to one touch-sensing electrode.

Figure 11:
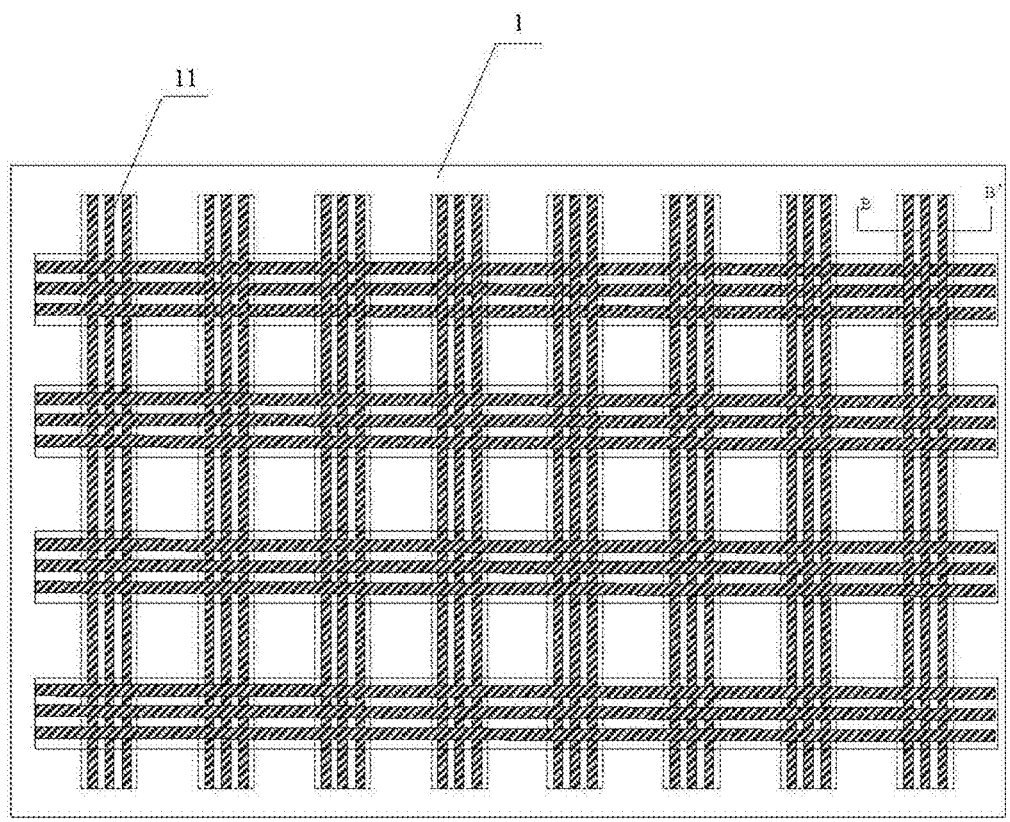
FIG. 11 is a top view of the substrate with the non-flat region corresponding to the touch-driving electrode and the touch-sensing electrode according to the embodiment of the present invention.

FIG. 11 is a top view of a non-flat region 11 provided at a region corresponding to the touch-driving electrode 3 and the touch-sensing electrode 2 at the same side of the substrate. As shown in FIG. 11, a plurality of concave regions is formed at the region corresponding to each touch-driving electrode 3 or touch-sensing electrode 2.

During the implementation, the number of the groove-shaped regions provided on the substrate at a region corresponding to one touch-sensing electrode may depend on the width of the touch-sensing electrode and the process conditions, and it is not defined herein.

Mode 2: The Concave Region is a Porous Region.

Figure 12:
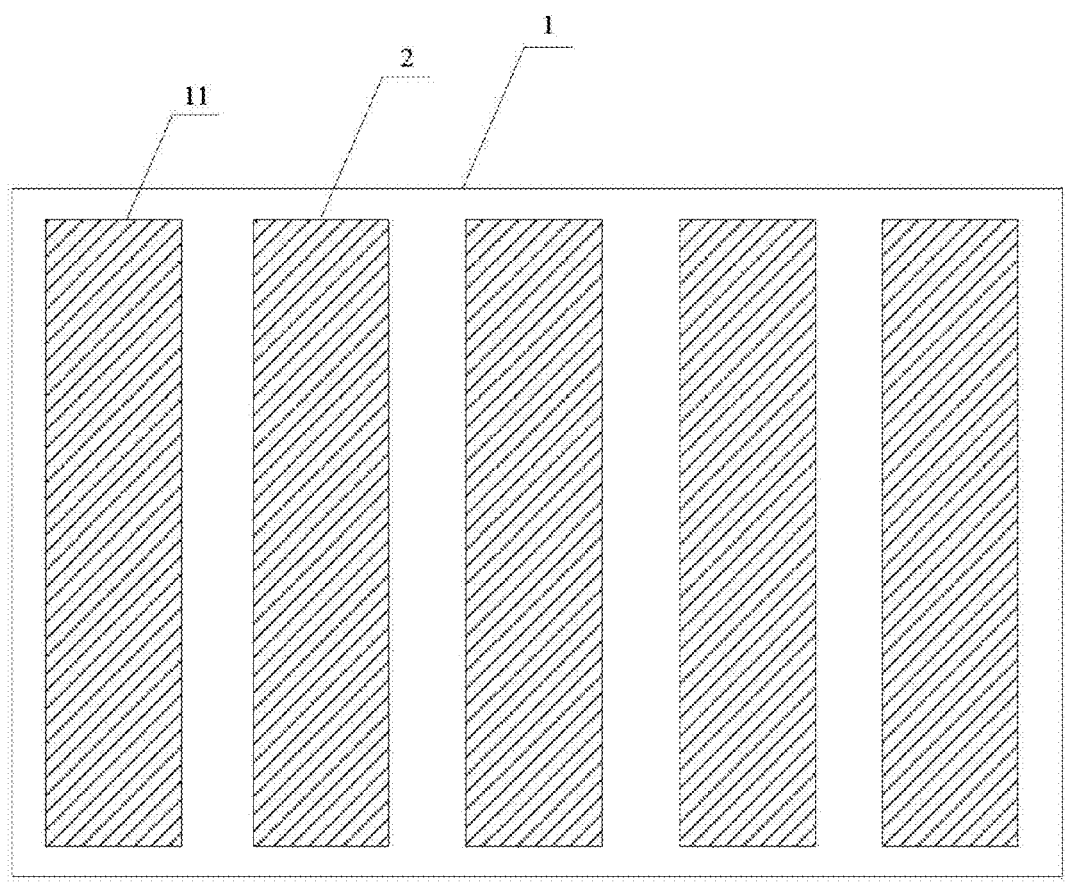
FIG. 12 is a top view of a touch screen having porous concave regions according to the first embodiment of the present invention.

FIG. 12 shows the porous region 11 provided on the substrate 1 at a region corresponding to the touch-sensing electrode 2. The touch-sensing electrode 2 is provided on the substrate 1 in accordance with the shape of the substrate 1, so as to be formed with the corresponding porous region.

Preferably, a hole at one end of the porous region close to the touch-sensing electrode has a pore size larger than that at the end away from the touch-sensing electrode, such that a surface of the hole has a certain slope relative to the substrate. The maximum pore size is slightly smaller than a distance between two long edges of the touch-sensing electrode, or the maximum pore size is one-half or one-third etc of, a distance between two long edges of the touch-sensing electrode. During the implementation, the maximum pore size may be determined according to the actual need and the layout process conditions, and it is not defined herein.

Preferably, the porous regions corresponding to the regions where the touch-sensing electrodes are located are arranged in a row or in several rows. Merely a row of porous regions 11 is shown in FIG. 12.

Preferably, there is an equal distance between any two adjacent porous regions in the same row on the substrate.

It is to be noted that, the arrangement modes of the porous regions, the distance between any two adjacent porous regions and the pore size as mentioned above are merely preferred ones, and during the implementation, they may be determined according to the process conditions and the width of the touch-sensing electrode, which are not defined herein.

Second Embodiment

The Touch Screen is an in-Cell or on-Cell Touch Screen

The In-Cell or On-Cell touch screen is a touch screen in which the touch-driving electrode and the touch-sensing electrode are built in the display screen. The display screen may be a LCD or an OLED.

In the second embodiment, the present invention is further described by taking the touch screen integrated with the touch-sensing electrode and/or the touch-driving electrode with concave regions as mentioned in the first embodiment.

It is to be noted that, the touch-driving electrode and the touch-sensing electrode may be arranged on a color film substrate or on an array substrate. Alternatively, the touch-sensing electrode may be arranged on the color film substrate while the touch-driving electrode may be arranged on the array substrate.

Following is an example where the touch-sensing electrode is arranged on the color film substrate of the liquid crystal display screen while the touch-driving electrode is arranged on the array substrate thereof.

Figure 13:
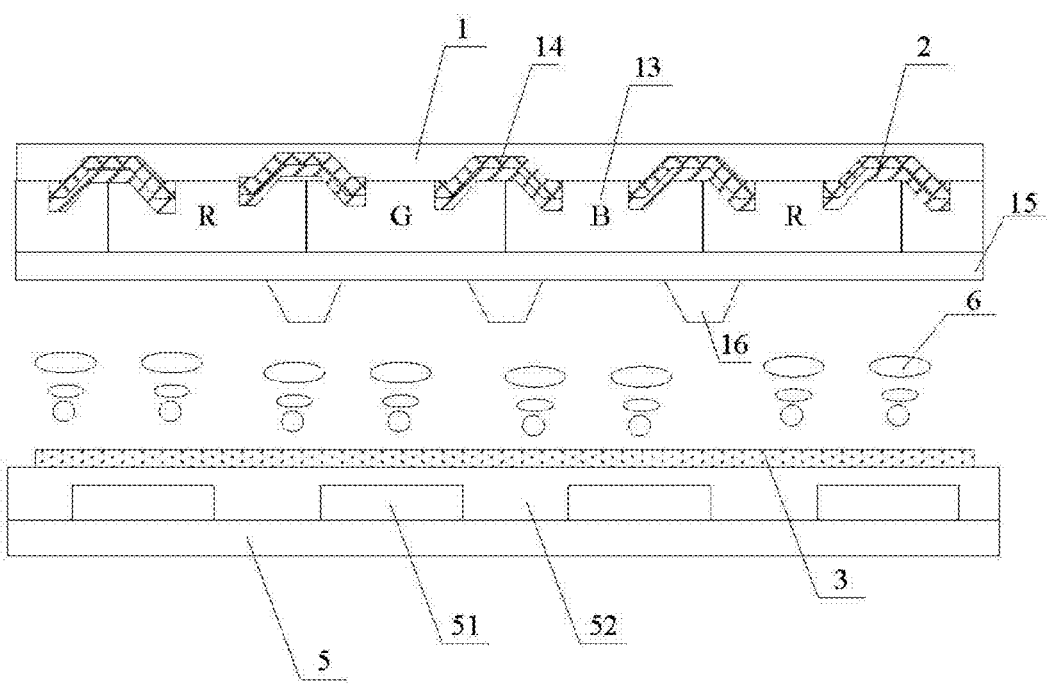
FIG. 13 is a schematic view showing a built-in touch screen structure according to the second embodiment of the present invention.

Referring to FIG. 13, the touch screen comprises: a first substrate 1 (corresponding to the substrate 1 in the first embodiment) and a second substrate 5 arranged in opposite to each other, the first substrate 1 being used to implement the color film substrate while the second substrate 5 being used to implement the array substrate; and a liquid crystal layer 6 arranged between the first substrate 1 and the second substrate 5, a non-flat region is provided on the first substrate 1, the non-flat region may be a concave region formed on the first substrate with a planar surface and below a horizontal plane of the surface of the first substrate; a black matrix 14, the touch-sensing electrode 2 and a color resin layer 13 are formed on the first substrate 1; the black matrix 14 is formed on the first substrate 1 in accordance with the concave region on the first substrate 1 so as to be formed with a corresponding concave region; the touch-sensing electrode 2 is formed on the black matrix 14 in accordance with a shape of the black matrix 14 so as to be formed with a corresponding concave region; the color resin layer 13 is arranged above the black matrix 14; and the touch-sensing electrode 2 is formed at the region where the black matrix 14 is located, and distributed along a first direction.

Preferably, referring to FIG. 13, the touch screen further comprises: a flat layer 15 arranged above the color resin layer 13 and a spacer 16 arranged above the flat layer 15.

The spacer may be of a post or comb shape, or of any other shapes, and it is not defined herein.

During the implementation, the touch-sensing electrode and the black matrix may also be arranged such that the touch-sensing electrode is arranged on the first substrate in accordance with the shape of the first substrate so as to be formed with a corresponding non-flat region, and the black matrix is arranged on the touch-sensing electrode in accordance with the shape of the touch-sensing electrode so as to be formed with a corresponding non-flat region.

The second substrate 5 is provided with a pixel array 51, and the touch-driving electrode 3 is distributed above the pixel array 51 along the second direction. The pixel array 51 is insulated from the touch-driving electrode 3 via a second insulating layer 52.

Preferably, the region of the second substrate 5 where the touch-driving electrode 3 is to be formed may also be provided with a non-flat region, and the touch-driving electrode 3 is arranged on the second substrate 5 in accordance with the shape of the second substrate 5 so as to be formed with the corresponding non-flat region.

The first direction intersects the second direction. In FIG. 13, the first direction refers to the vertical direction, while the second direction refers to the horizontal direction.

Preferably, the spacer is arranged at a region corresponding to the black matrix.

The non-flat regions may be provided on the first substrate in the second embodiment in an identical manner as those provided on the substrates in the first embodiment. The difference is that the touch-driving electrode and the touch-sensing electrode are provided at different positions. The non-flat regions are formed on the substrates in both the first and second embodiments. The touch-sensing electrode and/or the touch-driving electrode are arranged on the substrate in accordance with the shape of the substrate so as to be formed with the corresponding non-flat regions, which will not be repeated herein.

In the touch screen according to the second embodiment, the touch-sensing electrode may be arranged on the black matrix which is arranged on the substrate, or between the black matrix and the substrate, or on the other insulating layer, as long as it is able to ensure that the touch-sensing electrode is formed with the non-flat region corresponding to the shape of the substrate.

Preferably, the touch-sensing electrode is provided at a region corresponding to the black matrix, so as not to affect the aperture ratio and the light transmission rate of the pixels.

Preferably, in the In-cell or On-cell touch screen as shown in FIG. 13, the second substrate 5 is provided with a common electrode for displaying an image. At this time, the liquid crystal display screen may be in an In-Plane-Switching (IPS) mode and an Advanced Super Dimension Switch (ADS) mode. The common electrode is part-time driven. In the image displaying stage, a voltage Vcom is applied to the common electrode so as to display the image, and in the touching stage, a high-frequency voltage signal is applied to the common electrode so as to perform the touch. According to such an arrangement, it is able to simplify the structure of the built-in touch screen, save the production cost of the product, and improve the competitiveness of the product.

It is to be noted that, in the in-cell or on-cell touch screen according to the second embodiment, the touch-driving electrode is arranged on the second substrate, and the touch-sensing electrode is arranged on the first substrate. During the implementation, the arrangement of the touch-driving electrode and the touch-sensing electrode is not limited to the mode mentioned in the second embodiment, and any substrate which includes the concave or convex regions and on which the touch-sensing electrode may be arranged according to the shape of the substrate so as to be formed with the corresponding no-flat region shall also fall within the scope of the present invention.

The modes of manufacturing the substrate having the concave regions are briefly described hereinafter.

Usually, the substrate may be a glass substrate or a flexible plastic substrate. The following description is made by taking the glass substrate as an example.

Mode 1: The Concave Regions are Formed on the Glass Substrate During the Procedure of Forming the Glass Substrate.

The concave regions may be formed, for example, by means of a float technology, a slot down draw technology or an overflow fusion draw technology.

When the concave regions are formed by means of the float technology, the molten glass continuously flows from a tank furnace to and floats on a surface of the molten tin having a large relative density. Under the effect of the gravity and the surface tension, the glass liquid is spread over the surface of the molten tin. At this time, desired channels or via-holes are formed on a surface of the glass using a fixture. The structure of the concave region (e.g., a groove-shaped region or a porous region) depends on a shape of the fixture. The glass is then cooled and annealed so as to obtain the flat glass having the concave regions.

When the concave regions are formed by means of the slot down draw technology, the molten glass flows out from a slot bushing groove plated with platinum, and the thickness of a glass film layer may be adjusted according to the slot size and the down-drawing speed. The desired channels or via-holes are formed on the surface of the glass using a fixture. The glass is then cooled so as to obtain the flat glass having the concave regions.

When the concave regions are formed by means of the Overflow fusion draw technology, the molten liquid glass is injected into a fusion machine via a pipe. When the body is cooled, it will flow out the fusion machine from both sides. The effluent molten glass will flow down a refractory wall and then merge at the end of the wall. The desired channels or via-holes are formed on the surface of the glass using a fixture, thereby to form the concave regions at different regions of the glass substrate.

Mode 2: The Concave Regions are Formed on the Glass Substrate after the Formation of the Glass Substrate.

To be specific, after the formation of the glass substrate, the concave regions may be formed on the glass substrate by a layout process such as exposing, developing, photolithography and etching. The concave regions may be formed on the glass substrate by using dry etching and wet etching. For the dry etching, a sputtering gas at a high speed may be used, while for the wet etching, an acid solution (e.g., HF) may be used.

It is to be noted that, in the figures of the present invention, the thickness and the relative size of each film layer are for illustrative purpose only, but do not reflect the actual thickness and relative size. In addition, such words as "on" and "under" mentioned in the present invention are merely used to show the position relationship of two film layers, but do not mean that the two film layers have the same pattern or the projection of the two film layers onto the substrate overlaps with each other. For example, when the black matrix is arranged on the substrate and the color resin layer is arranged on the black matrix, it merely refers to the relative positions of the substrate, the black matrix and the color resin layer, while the patterns of the black matrix and the color resin layer are not defined herein.

The present invention further provides a display device comprising the above-mentioned touch screen and display panel. When the touch screen is an Add-on touch screen, the touch screen is added onto the display panel, and when the touch screen is an In-cell or On-cell touch screen, the touch screen is integrated into the display panel.

The display device may be a liquid crystal panel, a liquid crystal display, a liquid crystal TV, an OLED panel, an OLED display, an OLED TV or an electronic paper etc.

According to the present invention, the touch-sensing electrode in the touch screen is arranged on the substrate with the non-flat regions, so it is able to increase the surface area of the touch-sensing electrode, and enhance the projection electric field between the touch-driving electrode and the touch-sensing electrode. The touch-sensing electrode with a large surface area is arranged at the black matrix region with a limited width, so it is able to improve the touch effect of the touch screen without affecting the aperture ratio and the light transmission rate of the In-cell/On-cell touch screen. In addition, through the formation of non-flat regions on the substrate, it is able to reduce the thickness of the touch screen and reduce the difficulty of manufacturing the touch screen, thereby to reduce the possibility of undesirable phenomena for the touch screen.

Obviously, a person skilled in the art may make further modifications and improvements without departing from the spirit of the present invention. If these modifications and improvements fall within the scope of the appended claims and the equivalents thereof, the present invention is also intended to include these modifications and improvements.

What is claimed is:

1. A touch screen, comprising a first substrate and a second substrate arranged in opposite to each other, and a touch-driving electrode and a touch-sensing electrode arranged in a crossing manner on the first substrate and the second substrate, respectively,
   wherein a non-flat region is provided at a region of the first substrate on which the touch-sensing electrode is to be formed, and the touch-sensing electrode is arranged on the first substrate in accordance with a shape of the first substrate so as to be formed with a non-flat region corresponding to the non-flat region of the first substrate;
   the touch screen further comprises a color resin layer, the touch-sensing electrode is arranged between the first substrate and the color resin layer, one part of the touch-sensing electrode is arranged in the first substrate and the other part of the touch-sensing electrode is arranged in the color resin layer.

2. The touch screen according to claim 1, wherein the first substrate and the second substrate are different from each other,
   the non-flat region of the first substrate is a concave region formed on the first substrate with a flat surface and below a horizontal plane of the surface of the first substrate, and
   the touch screen further comprises a black matrix,
   wherein the black matrix is arranged on the first substrate in accordance with the concave region formed on the first substrate so as to be formed with a concave region corresponding to the concave region formed on the first substrate,
   the touch-sensing electrode is arranged on the black matrix in accordance with a shape of the black matrix so as to be formed with a concave region corresponding to the concave region of the black matrix,
   the color resin layer is arranged above the black matrix, and
   a plurality of pixel units distributed in a matrix manner is provided at one side of the second substrate close to the first substrate, and the touch-driving electrode is arranged above the pixel units.

3. The touch screen according to claim 2, further comprising:
   a flat layer formed on the color resin layer and a spacer formed on the flat layer.

4. The touch screen according to claim 2, wherein the touch-sensing electrode is arranged at a region corresponding to the black matrix.

5. The touch screen according to claim 1, wherein the non-flat region is a concave region;
   the concave region is provided at a region corresponding to the touch-sensing electrode, it is a groove-shaped region or a plurality of porous regions arranged along an extending direction of the touch-sensing electrode.

6. The touch screen according to claim 5, wherein the groove-shaped region corresponding to the touch-sensing electrode has a longitudinal section of a trapezoid, triangle or arc shape along a direction of a short edge of the touch-sensing electrode.

7. The touch screen according to claim 6, wherein the groove-shaped region corresponding to the touch-sensing electrode has a longitudinal section of an isosceles trapezoid, isosceles triangle or circle arc shape along a direction of the short edge of the touch-sensing electrode.

8. The touch screen according to claim 5, wherein there is an equal distance between any two adjacent porous regions among the plurality of porous regions corresponding to the touch-sensing electrode.

9. The touch screen according to claim 1, wherein a vertically overlapping surface between the touch-driving electrode and the touch-sensing electrode has an area less than a surface area of the touch-sensing electrode.

10. A display device, comprising the touch screen according to claim 1.

11. The display device according to claim 10, wherein the first substrate and the second substrate are different from each other,
   the non-flat region of the first substrate is a concave region formed on the first substrate with a flat surface and below a horizontal plane of the surface of the first substrate, and
   the touch screen further comprises a black matrix,
   wherein the black matrix is arranged on the first substrate in accordance with the concave region formed on the first substrate so as to be formed with a concave region corresponding to the concave region formed on the first substrate,
   the touch-sensing electrode is arranged on the black matrix in accordance with a shape of the black matrix so as to be formed with a concave region corresponding to the concave region of the black matrix,
   the color resin layer is arranged above the black matrix, and
   a plurality of pixel units distributed in a matrix manner is provided at one side of the second substrate close to the first substrate, and the touch-driving electrode is arranged above the pixel units.

12. The display device according to claim 11, wherein the touch screen further comprises:
   a flat layer formed on the color resin layer and a spacer formed on the flat layer.

13. The display device according to claim 11, wherein the touch-sensing electrode is arranged at a region corresponding to the black matrix.

14. The display device according to claim 10, wherein the non-flat region is a concave region;
   the concave region is provided at a region corresponding to the touch-sensing electrode, it is a groove-shaped region or a plurality of porous regions arranged along an extending direction of the touch-sensing electrode.

15. The display device according to claim 14, wherein the groove-shaped region corresponding to the touch-sensing electrode has a longitudinal section of a trapezoid, triangle or arc shape along a direction of a short edge of the touch-sensing electrode.

16. The display device according to claim 15, wherein the groove-shaped region corresponding to the touch-sensing electrode has a longitudinal section of an isosceles trapezoid, isosceles triangle or circle arc shape along a direction of the short edge of the touch-sensing electrode.

17. The display device according to claim 14, wherein there is an equal distance between any two adjacent porous regions among the plurality of porous regions corresponding to the touch-sensing electrode.

18. The display device according to claim 10, wherein a vertically overlapping surface between the touch-driving electrode and the touch-sensing electrode has an area less than a surface area of the touch-sensing electrode.

19. A touch screen, comprising:
a first substrate;
a second substrate arranged opposite to the first substrate;
a touch-driving electrode;
a touch-sensing electrode, the touch-driving electrode and the touch-sensing electrode being arranged in a crossing manner on the first substrate and the second substrate, respectively,
the first substrate having a non-flat region on which the touch-sensing electrode is to be formed, with the touch-sensing electrode being arranged on the first substrate in accordance with a shape of the first substrate so as to be formed with a non-flat region corresponding to the non-flat region of the first substrate;
the touch screen further comprises a color resin layer, the touch-sensing electrode is arranged between the first substrate and the color resin layer, one part of the touch-sensing electrode is arranged in the first substrate and the other part of the touch-sensing electrode is arranged in the color resin layer.

20. The touch screen according to claim 19, wherein the first substrate and the second substrate are different from each other,
the non-flat region of the first substrate is a concave region formed on the first substrate with a flat surface and below a horizontal plane of the surface of the first substrate, and
the touch screen further comprises a black matrix,
wherein the black matrix is arranged on the first substrate in accordance with the concave region formed on the first substrate so as to be formed with a concave region corresponding to the concave region formed on the first substrate,
the touch-sensing electrode is arranged on the black matrix in accordance with a shape of the black matrix so as to be formed with a concave region corresponding to the concave region of the black matrix,
the color resin layer is arranged above the black matrix, and
a plurality of pixel units distributed in a matrix manner is provided at one side of the second substrate close to the first substrate, and the touch-driving electrode is arranged above the pixel units.

* * * * *